(12) United States Patent
Khatri

(10) Patent No.: US 9,734,103 B2
(45) Date of Patent: Aug. 15, 2017

(54) SYSTEMS AND METHODS FOR TRANSFORMING A CENTRAL PROCESSING UNIT (CPU) SOCKET INTO A MEMORY AND/OR INPUT/OUTPUT (I/O) EXPANDER

(71) Applicant: Dell Products, L.P., Round Rock, TX (US)

(72) Inventor: Mukund P. Khatri, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 125 days.

(21) Appl. No.: 14/604,746

(22) Filed: Jan. 25, 2015

(65) Prior Publication Data

US 2016/0217105 A1    Jul. 28, 2016

(51) Int. Cl.
*G06F 9/00* (2006.01)
*G06F 13/28* (2006.01)

(52) U.S. Cl.
CPC .................... *G06F 13/28* (2013.01)

(58) Field of Classification Search
CPC ............................... G06F 15/82; G06F 13/28
USPC ............. 718/1, 104; 713/2; 711/148; 714/48
See application file for complete search history.

(56) References Cited

U.S. PATENT DOCUMENTS

| 2008/0178127 | A1* | 7/2008 | Dewkett | G06F 17/5045 716/132 |
| 2010/0218194 | A1* | 8/2010 | Dallman | G06F 9/5044 718/104 |
| 2011/0138160 | A1* | 6/2011 | Sato | G06F 12/109 713/2 |
| 2012/0042215 | A1* | 2/2012 | Murayama | G06F 11/1417 714/48 |
| 2013/0268747 | A1* | 10/2013 | Chang | G06F 13/14 713/2 |
| 2014/0331222 | A1* | 11/2014 | Zheng | G06F 9/45558 718/1 |
| 2015/0242342 | A1* | 8/2015 | Suzuki | G06F 13/1663 711/148 |

* cited by examiner

*Primary Examiner* — Aurel Prifti
(74) *Attorney, Agent, or Firm* — Fogarty LLP

(57) ABSTRACT

Systems and methods for transforming a Central Processing Unit (CPU) socket into a memory and/or Input/Output (I/O) expander. In an illustrative, non-limiting embodiment, an Information Handling System (IHS) may include a plurality of CPU sockets, each of the CPU sockets having one or more cores, and each of the one or more cores being associated with a respective one or more electronic circuits, the one or more electronic circuits including at least one of: a memory controller or an input/output (I/O) controller; and a Basic Input/Output System (BIOS) circuit coupled to the plurality of CPU sockets, the BIOS circuit having access to program instructions that, upon execution by the BIOS, cause the IHS to: initialize the plurality of CPU sockets; and report an electronic circuit associated to a first core of a first CPU socket as being instead associated with a second core of a second CPU socket.

17 Claims, 3 Drawing Sheets

SYSTEMS AND METHODS FOR TRANSFORMING A CENTRAL PROCESSING UNIT (CPU) SOCKET INTO A MEMORY AND/OR INPUT/OUTPUT (I/O) EXPANDER

FIELD

This disclosure relates generally to computer systems, and more specifically, to systems and methods for transforming a Central Processing Unit (CPU) socket into a memory and/or Input/Output (I/O) expander.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may be designed with a multi-core processor. A multi-core processor is a single computing component with two or more independent processing cores that are able to read and execute program instructions or software code. These multiple cores can run multiple instructions concurrently, thus increasing the overall processing speed for programs. Multiple cores typically are integrated onto a single integrated circuit die or integrated circuit or onto multiple dies in a single chip package, generally referred to as the IHS's Central Processing Unit (CPU). In some cases, a single IHS may include two or more multi-core CPUs.

Each multi-core processor may include one or more "CPU sockets." Each CPU socket may in turn have, for example, one or more processor cores, one or more memory controllers (which allow for dual in-line memory module(s) external to CPU socket), and one or more Peripheral Component Interconnect Express (PCIe) Input/Output (I/O) lanes.

The inventors hereof have recognized that certain software products (e.g., virtualization and virtual machine software) is licensed based upon a number of CPU sockets present in a given IHS, while certain other software products (certain database, Computer-aided design (CAD), Electronic design automation (EDA), etc.) are licensed based on number of CPU cores present in the given IHS. A good portion of these licensed software benefits from larger amounts of system memory. As a result, majority of customers end up purchasing servers with more CPU sockets just to get adequate amount of system memory. Lately, the number of cores in CPU sockets has been doubling every 2-3 years. However, the available memory and I/O circuitry has not historically increased at the same rate as the number of cores. In fact, in most virtualized applications, often the most significant performance limiting factor is insufficient memory; not the available number of cores.

Accordingly, the inventors hereof have identified a demand for larger memories (e.g., 24 DIMMs per socket instead of across two sockets) and/or I/O ports to be used with a smaller number of CPU sockets (e.g., one or two) within a multi-core processor, in order to reduce software licensing costs in certain applications.

SUMMARY

Embodiments of systems and methods for transforming a Central Processing Unit (CPU) socket into a memory and/or Input/Output (I/O) expander are described herein. In an illustrative, non-limiting embodiment, an Information Handling System (IHS) may include a plurality of Central Processing Unit (CPU) sockets, each of the CPU sockets having one or more cores, and each of the one or more cores being associated with a respective one or more electronic circuits, the one or more electronic circuits including at least one of: a memory controller or an input/output (I/O) controller; and a Basic Input/Output System (BIOS) circuit coupled to the plurality of CPU sockets, the BIOS circuit having access to program instructions that, upon execution by the BIOS, cause the IHS to: initialize the plurality of CPU sockets; and report an electronic circuit associated to a first core of a first CPU socket as being instead associated with a second core of a second CPU socket.

In some cases, the plurality of CPU sockets may include a single multi-core processor. Each of core in each of the plurality of CPU sockets may be configured to operate as a discrete logical processor. The electronic circuit associated with the first core of the first CPU socket may be physically disposed closer to the first core than to the second core of the second CPU socket. Each of the memory controllers may be configured to communicate with one or more dual in-line memory modules (DIMMs). Also, the reporting operation may occur before the IHS boots into an Operating System (OS).

The program instructions, upon execution by the BIOS, may cause the IHS to: create or modify a Local Advanced Programmable Interrupt Controller (LAPIC) table of an Advanced Configuration and Power Interface (ACPI) to: identify at least one of: the second CPU socket or a number of core(s) of the second CPU socket; and not identify the first CPU socket as having any cores. Additionally or alternatively, the program instructions, upon execution by the BIOS, may further cause the IHS to modify an Advanced Configuration and Power Interface (ACPI) Static Resource Affinity Table (SRAT) to identify the memory controller associated with the first core of the first CPU socket as being coupled directly to the second core of the second CPU socket. Additionally or alternatively, the program instructions, upon execution by the BIOS, may further cause the IHS to create or modify an Advanced Configuration and Power Interface (ACPI) System Locality Information Table (SLIT) to identify the memory controller associated with the first core of the first CPU socket as including a remote memory coupled to the second core of the second CPU socket. Additionally or alternatively, the program instructions, upon execution by the BIOS, may further cause the IHS to create or modify Advanced Configuration and Power Interface (ACPI) proximity (PXM) information to report one or more Peripheral Component Interconnect Express (PCIe) root ports associated with the first core of the first CPU socket as logical PCIe root ports belonging to the second core of the second CPU socket. Additionally or alternatively, the program instructions, upon execution by the BIOS, may further cause the IHS to, in response to a System Management Mode (SMM) of operation being invoked to address a memory or I/O error of the first core of the first CPU socket during Operating System (OS) runtime, report the error as having been originated by the second core of the second CPU socket.

In another illustrative, non-limiting embodiment, a computer-implemented method, may include: initializing a plurality of Central Processing Unit (CPU) sockets within a multi-core processor of an Information Handling System (IHS); and prior to the IHS booting an Operating System (OS), reporting an electronic circuit of a first core of a first CPU socket as belonging to a second core of a second CPU socket. For example, the electronic circuit may include a memory controller local to the first core of the first CPU socket and/or an Input/Output (I/O) extender local to the first core of the first CPU socket.

The method may further comprise creating or modifying a Local Advanced Programmable Interrupt Controller (LAPIC) table of an Advanced Configuration and Power Interface (ACPI), wherein the LAPIC table is configured to identify the second core of the second CPU socket, and wherein the LAPIC table is configured not to identify the first core of the first CPU socket.

Additionally or alternatively, the method may further comprise creating or modifying an Advanced Configuration and Power Interface (ACPI) Static Resource Affinity Table (SRAT) to identify the memory controller as being coupled directly to the second core of the second CPU socket. Additionally or alternatively, the method may further comprise creating or modifying an Advanced Configuration and Power Interface (ACPI) System Locality Information Table (SLIT) to identify the memory controller as including a remote memory coupled to the second core of the second CPU socket. Additionally or alternatively, the method may further comprise modifying Advanced Configuration and Power Interface (ACPI) proximity (PXM) information to report one or more Peripheral Component Interconnect Express (PCIe) root ports local to the first core of the first CPU socket as logical PCIe root ports local to the second core of the second CPU socket. Additionally or alternatively, the method may further comprise, in response to a System Management Mode (SMM) of operation being invoked to address a memory or I/O error of the first core of the first CPU socket during Operating System (OS) runtime, reporting the error as having been originated by the second core of the second CPU socket.

In yet another illustrative, non-limiting embodiment, a non-transitory computer-readable medium may have program instructions stored thereon that, upon execution by an Information Handling System (IHS), cause the IHS to: initialize a plurality of Central Processing Unit (CPU) sockets; create or modify a Local Advanced Programmable Interrupt Controller (LAPIC) table of an Advanced Configuration and Power Interface (ACPI), wherein the LAPIC table is configured to identify a second core of a second CPU socket, and wherein the LAPIC table is configured not to identify a first core of a first CPU socket; create or modify an ACPI Static Resource Affinity Table (SRAT) to identify a memory controller corresponding to the first core of the first CPU socket as being associated with the second core of the second CPU socket; create or modify an ACPI System Locality Information Table (SLIT) to identify the memory controller as including a remote memory coupled to the second core of the second CPU socket; and in response to a System Management Mode (SMM) of operation being invoked to address a memory or I/O error of the first core of the first CPU socket during Operating System (OS) runtime, reporting the error as having been originated by the second core of the second CPU socket.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
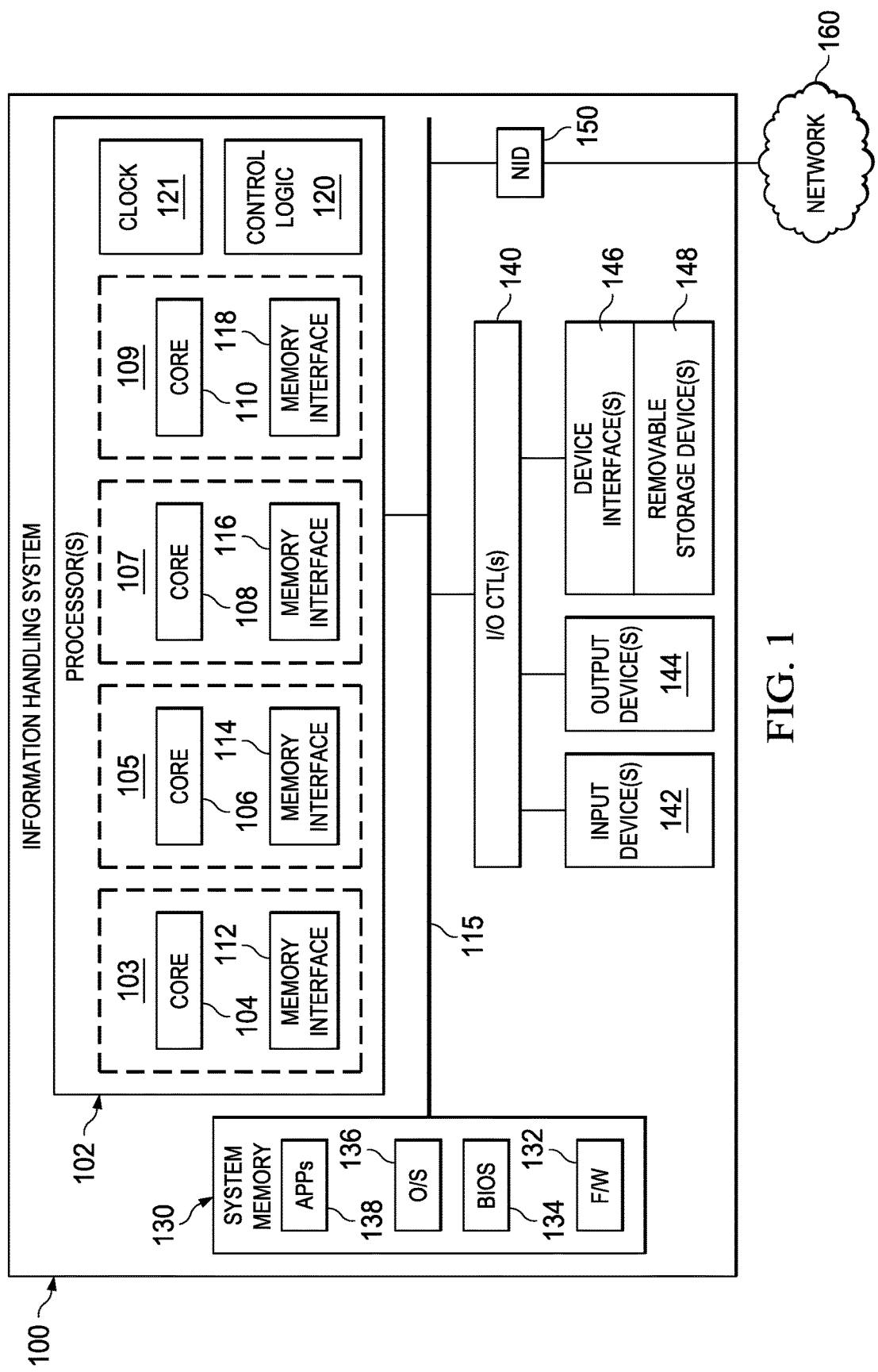
FIG. 1 illustrates an example IHS configured to implement various systems and methods described herein according to some embodiments.

Systems and methods for transforming a Central Processing Unit (CPU) socket into a memory and/or Input/Output (I/O) expander are described. As used herein, the term "CPU socket" refers to a combination of one or more processor core(s), one or more memory controller(s), and I/O circuitry local to or otherwise associated with corresponding processor core(s). In various implementations, a multi-core processor of an Information Handling System (IHS) may include a plurality of CPU sockets (e.g., 2, 4, etc.), and each CPU socket may include a number of cores.

In some cases, software licenses may be issued on a per-core basis. For example, if an IHS' multi-core processor includes two CPU sockets, each socket with its own single core, at least two licenses would ordinarily be needed in order for the IHS to execute certain licensed virtualization programs when those programs are licensed on a per-core basis. In contrast, by implementing systems and methods described herein, the IHS may be initialized with only one of the two CPU sockets using its processing core as such.

A first core of a first CPU socket may instead be transformed into a memory and/or I/O expander via firmware, such that a second core of a second CPU socket effectively has access to two sets of dual in-line memory modules (DIMMs)—that is, the second CPU core of the second CPU socket has access to a second set of DIMMs that is associated with the second core by default, and it also has access to a first set of DIMMs local to the first core of the first CPU socket as if it were its own. Prior to the IHS' operating system being booted, the first socket may be reported to the system as having "zero cores," but full memory and/or I/O controllers. Hence, the per-core costs of certain licensed software may be significantly reduced.

In the following detailed description of exemplary embodiments of the disclosure, specific exemplary embodiments in which the disclosure may be practiced are described in sufficient detail a person of ordinary skill in the art to practice the disclosed embodiments. For example, specific details such as specific method orders, structures, elements, and connections have been presented herein.

However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

For purposes of this disclosure, an IHS, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a CPU or hardware or software control logic, ROM, and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

FIG. 1 illustrates a block diagram representation of an example IHS 100, within which one or more of the described features of the various embodiments of the disclosure may be implemented. Particularly, IHS 100 has one or more processor(s) 102 coupled to system memory 130 via system interconnect 115. System interconnect 115 may be interchangeably referred to as a system bus. System memory 130 may include therein a plurality of software and/or firmware modules including firmware 132, Basic Input/output System (BIOS) 134, Operating System (OS) 136, and application(s) 138 (e.g., a licensed virtualization application or the like). The one or more software and/or firmware modules within system memory 130 (e.g., BIOS 134) may be loaded into processor(s) 102 during operation of IHS 100.

Processor(s) 102 include several CPU sockets 103, 105, 107, and 109. Each socket includes its respective one or more processing core(s) 104, 106, 108, or 110; as well as its associated dedicated memory controller(s) and/or I/O lane(s) 112, 114, 116, or 118. In operation, processing cores 104, 106, 108, or 110 may be configured communicate with each other and with control logic 120. Moreover, control logic 120 may control the operation of processing cores 104, 106, 108, or 110.

For example, according to an aspect of the described embodiments, control logic 120 may be configured to control the operating frequency and voltage or operating state of cores 104, 106, 108, or 110. Control logic 120 may also receive software and/or firmware modules from system memory 130 during the operation of processor(s) 102. In an embodiment, clock 121 is provided on processor(s) 102 and enables the generation of several different periodic frequency signals that may be applied to one or more of the cores 104, 106, 108, or 110 within one or more processor(s) 102.

IHS 100 also includes one or more input/output (I/O) controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interfaces 146, such as an optical reader, a Universal Serial Bus (USB), a card reader, Personal Computer Memory Card International Association (PCMCIA) slot, and/or a High-Definition Multimedia Interface (HDMI), may be associated with IHS 100. Device interface(s) 146 may be utilized to enable data to be read from or stored to corresponding removable storage device(s) 148, such as a Compact Disk (CD), Digital Video Disk (DVD), flash drive, or flash memory card. Device interfaces 146 may further include General Purpose I/O interfaces such as $I^{2C}$, SMBus, and peripheral component interconnect (PCI) buses.

IHS 100 comprises a Network Interface Device (NID) 150. NID 150 enables IHS 100 to communicate and/or interface with other devices, services, and components that are located external to IHS 100. These devices, services, and components may interface with IHS 100 via an external network, such as example network 160, using one or more communication protocols. Network 160 may be a local area network, wide area network, personal area network, and the like, and the connection to and/or between network and IHS 100 may be wired or wireless or a combination thereof. For purposes of discussion, network 160 is indicated as a single collective component for simplicity. However, it is appreciated that network 160 may comprise one or more direct connections to other devices as well as a more complex set of interconnections as may exist within a wide area network, such as the Internet.

A person of ordinary skill in the art will appreciate that the hardware components and basic configuration depicted in FIG. 1 and described herein may vary. For example, the illustrative components within IHS 100 are not intended to be exhaustive, but rather are representative to highlight components that may be utilized to implement systems and methods described herein. For example, other devices/components may be used in addition to or in place of the hardware depicted. The depicted example does not convey or imply any architectural or other limitations with respect to the presently described embodiments and/or the general disclosure.

Figure 2:
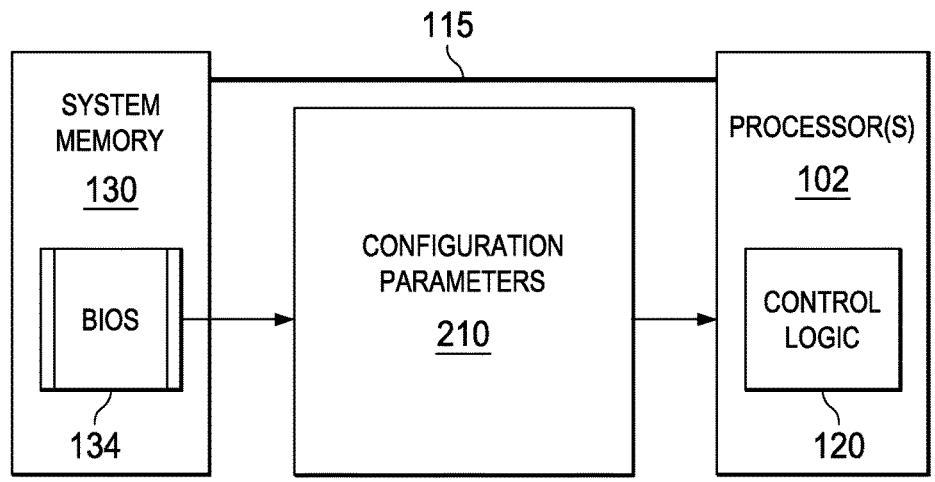
FIG. 2 illustrates an example of core configuration parameters being transmitted from a basic input output system (BIOS) to a processor control logic according to some embodiments.

With reference now to FIG. 2, there is illustrated an embodiment of core configuration parameters 210 being transmitted from BIOS 134 to control logic 120 of processor 102. In the discussion of FIG. 2, reference is also made to components illustrated in FIG. 1. During the initial startup of IHS 100 and processor(s) 102, configuration parameters 210 are transmitted from the BIOS 134 to processor control logic 120. Configuration parameters 210 may originally have been received from a user, and may include a selection of which of CPU sockets 103, 105, 107, and 109 (or how many) should have their cores enabled within processor(s) 102.

Generally speaking, disabled processing cores do not execute instructions and do not generate heat, while enabled processing cores execute instructions at a given frequency that is variable depending upon processor workloads and other factors that are internal to and based upon the design of the processor. The foregoing distinction between enabled and disabled processing cores is presented in contrast with active versus non-active (or idle) cores. When a processing core is merely idle but nonetheless enabled, it may not be used to execute threads but it still generates heat.

Again, according to some aspects of the disclosure, configuration parameters 210 may identify which (or how many) of processing cores 104, 106, 108, or 110 within CPU sockets 103, 105, 107, and 109, respectively, are to be disabled and/or enabled. In some cases, configuration parameters 210 may follow the Advanced Configuration and Power Interface (ACPI) specification. As such, BIOS 134 may load configuration parameters 210 in the form of ACPI Machine Language (AML) bytecode stored in ACPI tables. To make use of these ACPI tables, OS 136 may include an interpreter for the AML bytecode.

Figure 3:
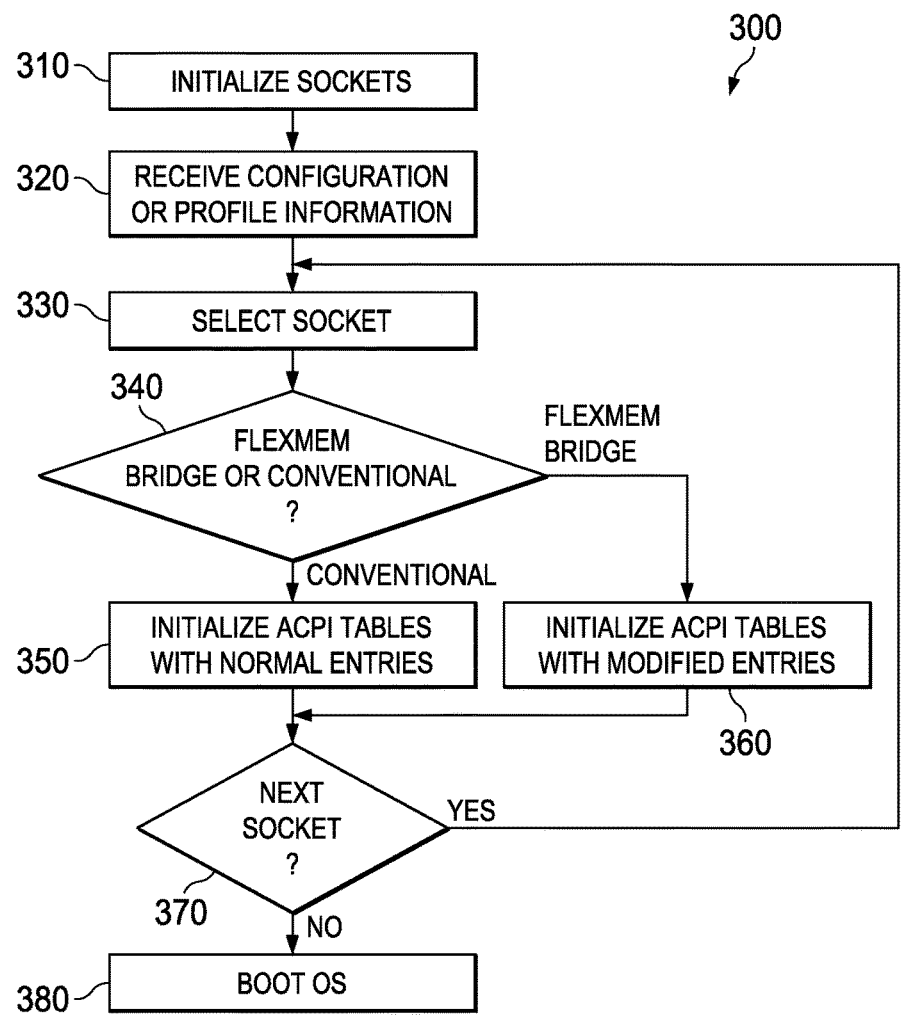
FIG. 3 is a flowchart illustrating an example of a method for transforming a Central Processing Unit (CPU) socket into a memory and/or Input/Output (I/O) expander according to some embodiments.

FIG. 3 is a flowchart illustrating an example of method 300 for transforming a CPU socket into a memory and/or I/O expander. In the discussion of FIG. 3, reference is also made to various components illustrated in FIGS. 1 and 2. In some embodiments, method 300 may be performed, at least in part, by BIOS 134 and processor control logic 120.

At block 310, one or more of CPU sockets 103, 105, 107, and 109 are initialized, for example, as part of a BIOS Power-On Self-Test (POST) procedure. At block 320, BIOS 134 may receive user configuration information and/or stored profile information. For example, such information may identify a particular core or number of cores to be used as processing cores; that is, which cores are being enabled as processing cores. Additionally or alternatively, the configuration information may identify a particular CPU socket or number of CPU sockets to be used as memory and/or I/O expanders; that is, which cores within one or more CPU sockets are effectively being disabled as processing cores such that they may still be employed as memory and/or I/O bridges for one or more processing cores of other CPU sockets.

At block 330, BIOS 134 may select a CPU socket to be configured. At block 340, BIOS 134 determines whether the selected CPU socket is to be configured as "FlexMemBridge" or a conventional configuration. In the latter case, BIOS 134 initializes ACPI tables with conventional or normal entries at block 350. In the former case, that is, when the CPU socket is initialized with a FlexMemBridge configuration, the ACPI tables are initialized with modified entries at block 360.

At block 370, BIOS 134 determines whether there is another CPU socket to be configured. If so, control passes to block 330 and the other CPU socket is selected. Otherwise, control passes to block 380 where the OS is booted.

Referring back to block 360, various embodiments provide for the modification of entries in the ACPI's Local Advanced Programmable Interrupt Controller (LAPIC) table, Static Resource Affinity Table (SRAT), System Locality Information Table (SLIT), and/or proximity (PXM) information, for example, as part of configuration parameters 210 of FIG. 2.

For instance, in a hypothetical scenario, only processing cores 104 and 106 may be reported in the LAPIC table, while cores 108 and 110 may be unreported. At block 340, BIOS 134 may create or modify the ACPI's SRAT table, such that memory circuitry 116 may be identified as being coupled to CPU socket 103 (in addition to socket 103's own memory 112), and memory circuitry 118 may be identified as belonging to CPU socket 105 (in addition to socket 105's own memory 114). That is, in a particular situation where each of memory circuits 112-118 has 12 DIMMs, each of cores 104 and 106 would effectively have access to 24 DIMMs. The ACPI's SLIT table may identify memory circuitries 116 and 118 as being remote memories coupled to the CPU sockets 103 and 105, respectively.

In the same hypothetical scenario, ACPI's proximity (PXM) information may be modified as part of configuration parameters 210, for instance, to report one or more Peripheral Component Interconnect Express (PCIe) root ports from I/O circuitries 116 and 118 as additional logical PCIe root ports belonging to CPU sockets 103 and 106, respectively.

Conventional OS and hypervisors use the LAPIC table to detect the number of sockets in given system. Accordingly, using method 300, from the software's perspective fewer than all of processing cores 104, 106, 108, or 110 within CPU sockets 103, 105, 107, and 109 are present. Moreover, each enabled processing core has at least twice the amount of memory and/or number of I/O ports; which are borrowed from non-enabled or disabled cores.

During operation, in response to a System Management Mode (SMM) being invoked to address a memory or I/O error of a non-enabled or disabled CPU socket during runtime, the error may be reported having been originated by one of the enabled CPU sockets. For example, still in the same hypothetical scenario, a memory or I/O error of CPU socket 107 (circuitry 116) may be reported as having been originated by CPU socket 103, and memory or I/O error of CPU socket 109 (circuitry 118) may be reported as having been originated by CPU socket 105.

Additionally or alternatively, one or more user visible non-OS Application Programming Interfaces APIs in IHS 100 may be configured to report a fewer number of processing cores than all available cores, including, for example, BIOS Setup, System Management BIOS (SMBIOS), ACPI, Unified Extensible Firmware Interface (UEFI), Integrated Dell™ Remote Access Controller (iDRAC) Graphical User Interface (GUI), and/or thermal/power monitoring interfaces.

Figure 4:
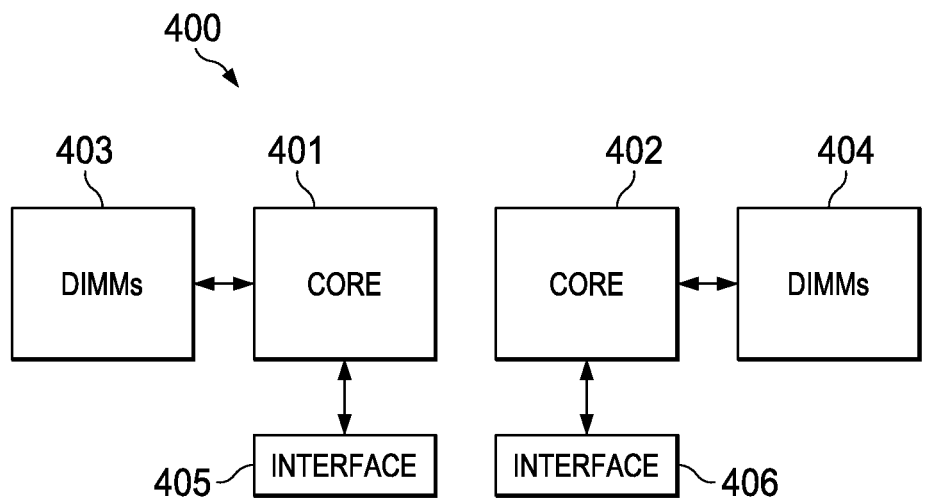
FIGS. 4 and 5 illustrate an example of a FlexMemBridge configuration according to some embodiments.
Figure 5:
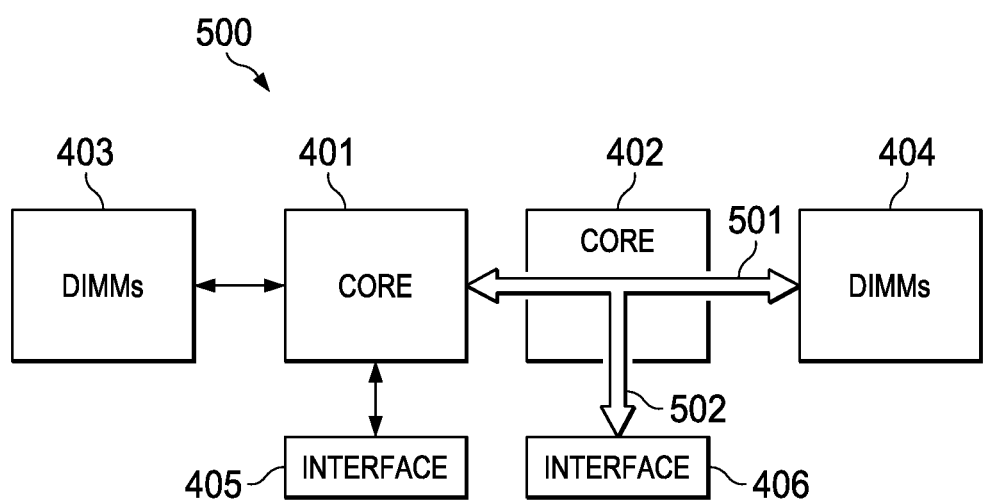

FIGS. 4 and 5 illustrate an example of a FlexMemBridge configuration according to some embodiments. In this example, processing cores 401 and 402 have associated DIMMs 403 and 404, as well as associated I/O controllers 405 and 406, respectively. Ordinarily, as shown in diagram 400, core 401 does not have access to circuitries 404 or 406, whereas core 402 does not have access to circuitries 403 or 405. Diagram 500 shows the result of application of method 300 to set core 402 in FlexMemBridge configuration. Particularly, core 402 is set into bridge state such that core 401 has access to DIMMs 404 and I/O 406 via connections 501 and 502, respectively, without core 402 being reported as processing core in the ACPI tables and therefore being unreported to the OS or other software for licensing purposes. Accordingly, in this example, FlexMemBridge configuration 500 provides core 401 without twice the memory and/or I/O circuitry without increasing licensing costs.

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a plurality of Central Processing Unit (CPU) circuits, wherein each of the CPU circuits comprises a core and at least one of: a memory controller or an input/output (I/O) lane; and
a Basic Input/Output System (BIOS) coupled to the plurality of CPU circuits, the BIOS having program instructions stored thereon that, upon execution by the IHS, cause the IHS to:
identify a memory controller or I/O lane of a first CPU circuit as belonging to a second CPU circuit;
identify the first CPU circuit as not having any cores; and
create or modify an Advanced Configuration and Power Interface (ACPI) System Locality Information Table (SLIT) to identify a memory controller of the first CPU circuit as being a remote memory coupled to the second CPU circuit.

2. The IHS of claim 1, wherein the plurality of CPU circuits include a single multi-core processor.

3. The IHS of claim 1, wherein each core in each of the plurality of CPU circuits is configured to operate as a logical processor.

4. The IHS of claim 1, wherein the memory controller or I/O lane is physically disposed closer to a first core of the first CPU circuit than to a second core of the second CPU circuit.

5. The IHS of claim 1, wherein the identifying enables a memory controller of the second CPU circuit to communicate with two or more dual in-line memory modules (DIMMs).

6. The IHS of claim 1, wherein the program instructions, upon execution by the IHS, further cause the IHS to create or modify a Local Advanced Programmable Interrupt Controller (LAPIC) table of an Advanced Configuration and Power Interface (ACPI).

7. The IHS of claim 1, wherein the program instructions, upon execution by the IHS, further cause the IHS to modify an Advanced Configuration and Power Interface (ACPI) Static Resource Affinity Table (SRAT) to identify a memory controller of the first CPU circuit as being coupled directly to a core of the second CPU circuit.

8. The IHS of claim 1, wherein the program instructions, upon execution by the IHS, further cause the IHS to create or modify Advanced Configuration and Power Interface (ACPI) proximity (PXM) information to report one or more Peripheral Component Interconnect Express (PCIe) root ports of the first CPU circuit as logical PCIe root ports belonging to the second CPU circuit.

9. The IHS of claim 1, wherein the program instructions, upon execution by the IHS, further cause the IHS to, in response to a System Management Mode (SMM) of operation being invoked to address a memory or I/O error of the first CPU circuit during Operating System (OS) runtime, report the error as having been originated by the second CPU circuit.

10. The IHS of claim 1, wherein the identifying operations occur before the IHS boots into an Operating System (OS).

11. A computer-implemented method, comprising:
  initializing a plurality of Central Processing Unit (CPU) circuits within a multi-core processor of an Information Handling System (IHS), wherein each of the CPU circuits comprises at least a core and an electronic circuit associated with the core, and wherein each electronic circuit includes at least one of: a memory controller or an input/output (I/O) lane;
  prior to the IHS booting an Operating System (OS), reporting an electronic circuit of a first core of a first CPU circuit as belonging to a second core of a second CPU circuit, wherein the electronic circuit includes an I/O extender local to the first core of the first CPU circuit; and
  modifying Advanced Configuration and Power Interface (ACPI) proximity (PXM) information to report one or more Peripheral Component Interconnect Express (PCIe) root ports local to the first core of the first CPU circuit as logical PCIe root ports local to the second core of the second CPU circuit.

12. The computer-implemented method of claim 11, wherein the electronic circuit includes a memory controller local to the first core of the first CPU circuit.

13. The computer-implemented method of claim 12, further comprising creating or modifying a Local Advanced Programmable Interrupt Controller (LAPIC) table of an Advanced Configuration and Power Interface (ACPI), wherein the LAPIC table is configured to identify the second core of the second CPU circuit, and wherein the LAPIC table is configured not to identify the first core of the first CPU circuit.

14. The computer-implemented method of claim 13, further comprising creating or modifying an Advanced Configuration and Power Interface (ACPI) Static Resource Affinity Table (SRAT) to identify the memory controller as being coupled directly to the second core of the second CPU circuit.

15. The computer-implemented method of claim 14, further comprising creating or modifying an Advanced Configuration and Power Interface (ACPI) System Locality Information Table (SLIT) to identify the memory controller as including a remote memory coupled to the second core of the second CPU circuit.

16. The computer-implemented method of claim 11, further
  comprising, in response to a System Management Mode (SMM) of operation being invoked to address a memory or I/O error of the first core of the first CPU circuit during Operating System (OS) runtime, reporting the error as having been originated by the second core of the second CPU circuit.

17. A hardware memory device having program instructions stored thereon that, upon execution by an Information Handling System (IHS), cause the IHS to:
  initialize a plurality of Central Processing Unit (CPU) circuits, wherein each of the CPU circuits comprises at least a core and a memory controller;
  create or modify a Local Advanced Programmable Interrupt Controller (LAPIC) table of an Advanced Configuration and Power Interface (ACPI), wherein the LAPIC table is configured to identify a second core of a second CPU circuit, and wherein the LAPIC table is configured not to identify a first core of a first CPU circuit;
  create or modify an ACPI Static Resource Affinity Table (SRAT) to identify a memory controller corresponding to the first core of the first CPU circuit as belonging to the second core of the second CPU circuit;
  create or modify an ACPI System Locality Information Table (SLIT) to identify the memory controller as including a remote memory coupled to the second core of the second CPU circuit; and
  in response to a System Management Mode (SMM) of operation being invoked to address a memory or I/O error of the first core of the first CPU circuit during Operating System (OS) runtime, identifying the error as having been originated by the second core of the second CPU circuit.

* * * * *